United States Patent [19]

Roels

[11] 4,394,846
[45] Jul. 26, 1983

[54] CULTURE OF MARINE SPECIES

[76] Inventor: Oswald A. Roels, 28 Hewit Dr., Corpus Christi, Tex. 78404

[21] Appl. No.: 300,565

[22] Filed: Sep. 9, 1981

[51] Int. Cl.³ .............................................. A01K 61/00
[52] U.S. Cl. ........................................ 119/2; 119/3; 119/4
[58] Field of Search ..................................... 119/2, 3, 4

[56] References Cited

U.S. PATENT DOCUMENTS

| | | | |
|---|---|---|---|
| 3,473,509 | 10/1969 | Miyamura | 119/2 |
| 3,916,832 | 11/1975 | Sweeney | 119/2 |
| 3,928,145 | 12/1975 | Othmer | 203/11 |
| 4,055,145 | 10/1977 | Mager et al. | 119/2 |
| 4,137,868 | 2/1979 | Pryor | 119/2 |
| 4,144,840 | 3/1979 | Bubien | 119/3 |
| 4,213,421 | 7/1980 | Droese et al. | 119/3 |
| 4,240,376 | 12/1980 | Kominami et al. | 119/2 |

FOREIGN PATENT DOCUMENTS

2441788 3/1976 Fed. Rep. of Germany .......... 119/2

OTHER PUBLICATIONS

Power, Fresh Water, and Food from Cold, Deep Seawater by Donald F. Othmer and Oswald A. Roels.

*Primary Examiner*—Hugh R. Chamblee
*Attorney, Agent, or Firm*—Arnold, White & Durkee

[57] ABSTRACT

A method of utilizing ocean waters for the culture of marine species. The method includes maintaining a flow of ocean waters through a finfish culture stage and supplying finfish feed to the stage for the culture of finfish therein. The method further includes maintaining a flow of finfish culture stage effluent through a shrimp culture stage and supplying plankton nutrients to that stage for the culture of plankton to constitute part of a shrimp feed for the culture of shrimp, and maintaining a flow of shrimp culture stage effluent through a filter feeder stage for the culture of filter feeders therein. The effluent from the filter feeder stage is fed to a seaweed culture stage for the culture of seaweed and clarification of the effluent, whereafter the clarified effluent is discharged.

19 Claims, 1 Drawing Figure

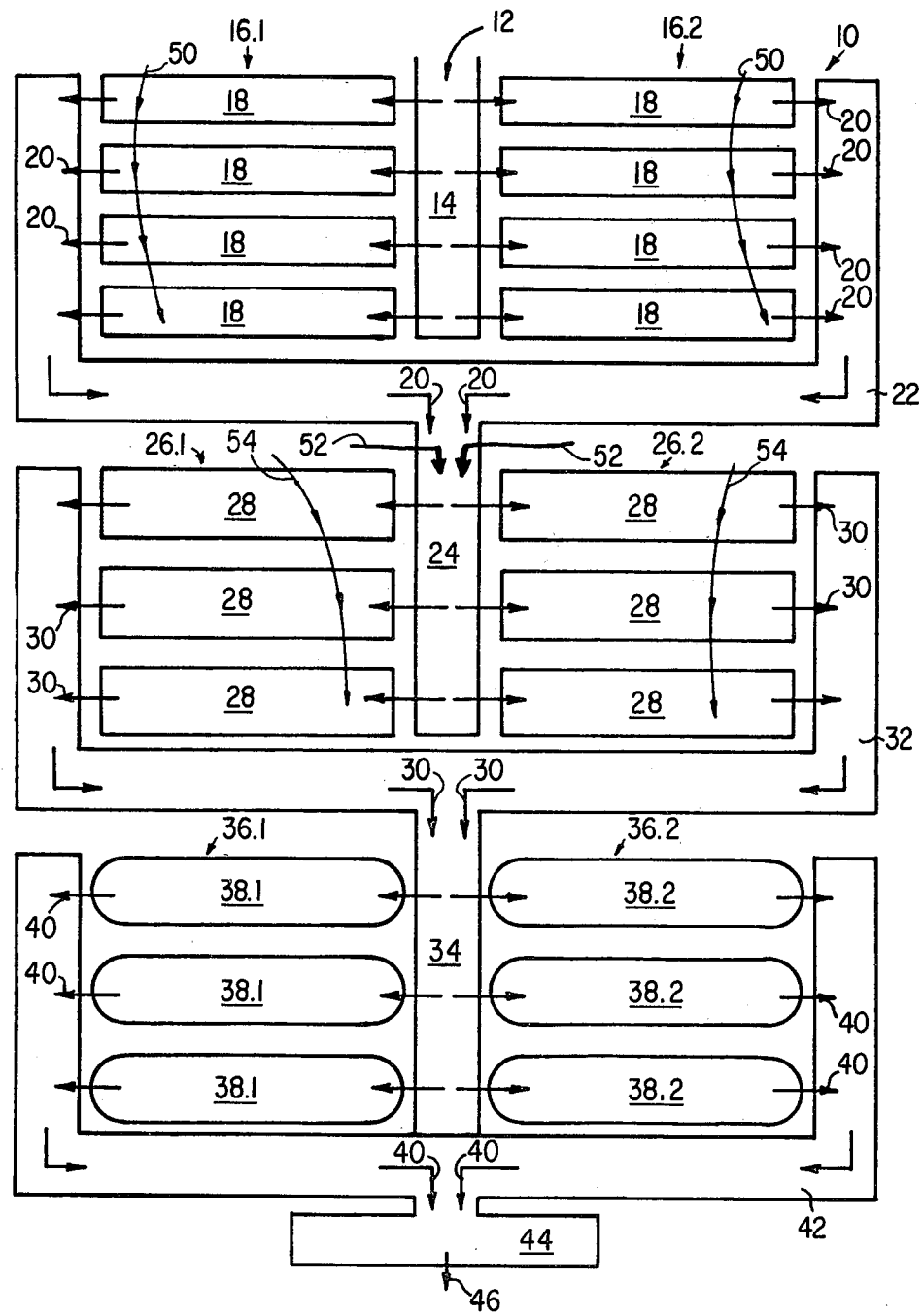

CULTURE OF MARINE SPECIES

This invention relates to the culture of marine species. More particularly, this invention relates to a method for the culture of marine species and a marine polyculture system for the rearing of marine species.

Successful mariculture has been undertaken mainly in coastal areas using estuarine or coastal waters which are rich in nutrients provided by effluents from the land. Large shrimp farms have thus been built in the coastal zone of Ecuador and in the coastal zones of other Latin American countries. These shrimp culture systems rely partially on the eco-system and marine food chains that develop in ponds to supply the feed for the shrimp. In certain cases natural foods produced in ponds are supplemented by shrimp feed or the natural food chains are stimulated by the addition of fertilizer.

The disadvantage of these systems is that water quality of the surface waters in estuaries and near shore areas may vary greatly depending upon the nature of the effluents from the land. Herbicides, pesticides and other agricultural effluents may thus find their way into such mariculture systems. Similarly, industrial or urban effluents may adversely affect the water quality for such mariculture systems in coastal areas.

There are, however, many near shore costal areas where the water quality is very high due to the absence of pollutants and agricultural effluents. Because of their high quality and purity, such waters would be particularly suitable for use in fish culture. However, because such waters have a low nutrient content and a low productivity they cannot be used successfully in mariculture systems.

Such high quality waters are found near many oceanic islands, particularly in the subtropical and tropical ocean where the near shore waters are very clear and transparent due to the lack of nutrients, the lack of pollutants, and the lack of significant effluent from the land.

These nutrient deficient or nutrient poor ocean waters are available in unlimited quantities and are readily accessible particularly near many oceanic islands in the subtropical and tropical oceans. It would therefore be particularly advantageous if these nutrient deficient or nutrient poor ocean waters could be used effectively and economically in mariculture systems.

Because of the lack of nutrients in such nutrient deficient or nutrient poor ocean waters, proposals have been made that waters to be employed in mariculture systems should be the deep ocean nutrient rich waters. Such deep ocean waters are frequently not available in many places where conditions are otherwise favorable and high quality nutrient poor surface water is available in unlimited quantities. In addition, the utilization of deep ocean waters involves the expense of pipeline systems and the expense of raising such deep ocean waters.

It is an object of this invention to provide a culture system for the culture of marine species. It is another object of this invention to provide a marine culture system for the utilization of nutrient deficient or nutrient poor ocean waters.

The nutrient deficient or nutrient poor ocean waters referred to in the specification are waters of the type which are frequently found in tropical and subtropical areas and which are poor or deficient in nutrients. These waters are often entirely devoid of nutrients and are therefore particularly poor in marine plants and animals. These waters are, however, advantageous for finfish culture because few contaminants are present and because these waters have the high oxygen levels which are required for finfish development.

In accordance with one aspect of the invention, a method of utilizing nutrient deficient ocean waters for the culture of marine species, comprises:

(a) maintaining a flow of nutrient deficient ocean waters into and through a finfish culture stage, and supplying finfish feed to the stage for the culture of finfish therein;

(b) maintaining a flow of finfish culture stage effluent through a shrimp culture stage, and supplying plankton nutrients to that stage for the culture of plankton to constitute shrimp feed for the culture of shrimp in that stage; and (c) maintaining a flow of shrimp culture stage effluent through a filter feeder stage for the culture of filter feeders therein.

In a preferred embodiment of this aspect of the invention, the method further comprises feeding filter feeder stage effluent to a seaweed culture stage for the culture of seaweed and clarification of the effluent, and discharging effluent therefrom.

The method may comprise supplying supplemental shrimp feed to the shrimp culture stage depending upon the individual species of shrimp selected for growth in the shrimp culture stage. However, even where supplemental shrimp feed is supplied, the addition of plankton nutrients to the shrimp culture stage would preferably be controlled and the flow of fluid through the shrimp culture stage will be controlled to provide for effective development of phytoplankton blooms in the shrimp culture stage and for the effective development of zooplankton blooms in that stage so that the plankton can constitute a qualitatively important fraction of the shrimp nutrient requirements.

The addition of plankton nutrient together with finfish excreta and finfish food waste products from the finfish culture stage can therefore provide for the natural development of phytoplankton and zooplankton blooms thereby reducing the cost of shrimp feed.

Supplemental shrimp feed to be supplied to the shrimp culture stage may be prepared separately in a manner known to those of ordinary skill in the art, to provide an adequate and complete diet or diet supplement to shrimp for effective growth.

In an embodiment of the invention, brine shrimp may be produced as one of the filter feeder species in the filter feeder stage. Brine shrimp may therefore be recovered from the filter feeder stage and supplied to the shrimp culture stage as the, or as part of a, supplemental shrimp feed.

While finfish in the finfish culture stage will be provided with a complete balanced diet to furnish all necessary nutrients for rapid growth and development, brine shrimp so produced may be incorporated as part of the finfish feed.

The flow of ocean water through the finfish culture stage will preferably be maintained at a sufficient rate to maintain oxygen levels at or near saturation point, and to remove finfish feed waste and finfish excreta at a sufficient rate to provide for most effective finfish growth and development.

Because the ocean waters employed are deficient in nutrients, the high purity of the water in the finfish culture stage can be maintained by insuring a sufficient water turnover rate to limit plankton development.

The method may include culling filter feeders from the filter feeder stage, and supplying such culled filter feeders to the finfish stage and/or to the shrimp culture stage as feed.

The method may include the further step of processing marine species produced in the system, and then utilizing processed waste of such marine species as finfish and/or shrimp feed for the finfish and/or shrimp stages of the processes.

Each of the finfish, shrimp and filter feeder culture stages may conveniently be in the form of one or more ponds or raceways. Where there are a plurality of ponds or raceways in any stage, they would be arranged in parallel to insure the same quality of water in each pond or raceway of each stage.

The invention further extends to a marine polyculture system for the rearing of marine species, the system comprising maintaining a flow of salt water through a finfish culture stage and supplying finfish feed to the stage for the culture of finfish, maintaining a flow of finfish culture stage effluent through a crustacean culture stage and supplying plankton nutrients to the stage to develop plankton blooms in that stage for the culture of crustacean species in that stage, and maintaining a flow of effluent from the crustacean culture stage through a filter feeder culture stage for the culture of filter feeders therein.

The crustacean species cultured in the crustacean culture stage may be any species which can utilize plankton blooms developed in that stage as a feed or as a feed component. The crustacean species may conveniently be a species of shrimp such as, for example, Penaeid shrimp.

The salt water may conveniently, for example, be in the form of ocean water, particularly high quality ocean water, or water obtained from a well. High quality ocean water may, for example, comprise deep ocean water which is rich in nutrients. In this event, the rate of flow may again be maintained at a sufficient level through the finfish culture stage to inhibit the growth of planktonic and other marine organisms which can adversely affect the growth or development of finfish.

An embodiment of the invention is now described by way of example with reference to the accompanying drawing. The drawing shows a schematic representation, which is not to scale, of a typical marine polyculture system for the culture of marine species utilizing nutrient deficient ocean waters in accordance with this invention.

With reference to the drawing, reference numeral 10 refers generally to a marine polyculture system for the culture of marine species utilizing nutrient deficient or nutrient poor ocean waters.

The marine polyculture system 10 comprises introducing high purity nutrient deficient ocean water 12 into an intake zone 14. From the intake zone 14, the effluent ocean waters flow into and through two corresponding finfish culture stages 16.1 and 16.2 which are arranged in parallel.

Each finfish culture stage 16.1 and 16.2 comprises a plurality of vessels 18 in the form of tanks, ponds or raceways which are arranged in parallel.

The water flowing through each of the vessels 18 emerges as a finfish culture stage effluent 20 from each of the stages.

The finfish culture stage effluent 20 flows into a discharge zone 22 which leads to a further intake zone 24.

From the intake zone 24 the effluent 20 flows into and through two corresponding shrimp culture stages 26.1 and 26.2.

Each shrimp culture stage 26.1 and 26.2 comprises a plurality of vessels 28 which are in the form of shrimp ponds or raceways and are arranged in parallel.

Shrimp culture stage effluent 30 emerges from each vessel 28 into a common discharge zone 32 leading to a further intake zone 34.

From the intake zone 34, the shrimp culture stage effluent 30 flows into and through a filter feeder stage comprising a first filter feeder stage 36.1 and a second filter feeder stage 36.2. Each stage 36.1 and 36.2 comprises a plurality of raceways 38.1 and 38.2 respectively which are arranged in parallel.

The shrimp culture stage effluent 30 flowing through the raceways 38 emerges as filter feeder stage effluent 40 into a common discharge zone 42.

The discharge zone 42 leads to a seaweed culture stage 44.

From the seaweed culture stage 44 the final effluent 46 discharges back into the ocean.

In carrying out the method of this invention, the vessels 18 will be stocked with finfish of the desired species and finfish will be harvested from time to time as and when they have achieved the desired development and growth.

Finfish feed 50 will be supplied to each of the vessels 18 to provide a complete and balanced diet for the finfish species thereby insuring rapid growth and development. An appropriate finfish feed may be prepared on the basis of knowledge possessed and information available to those of ordinary skill in this art.

The nutrient deficient ocean waters employed in this preferred embodiment of the invention are tropical waters found near shore to a suitable island. They have a high purity and are deficient in or completely devoid of nutrients. These waters have an oxygen level approaching saturation which is ideal for the development of preferred finfish species.

The flow of the waters 12 through the vessels 18 will be maintained at a sufficient rate to insure adequate maintenance of the oxygen levels and to insure sufficiently rapid removal of finfish feed waste and finfish excreta to avoid adverse influences on the growth and development of finfish in the finfish culture stages 16.1 and 16.2.

In a typical preferred example of the invention, the flow of ocean water 12 through the vessels 18 may be maintained at a sufficiently rapid rate to provide for between 1 and 3 turnovers of water per day. Even more rapid turnovers may be provided for as the density of finfish is increased.

At these appropriate turnover rates, the oxygen levels will tend to be maintained near saturation. In addition, because of the low nutrient level and because of the rapid flow rate, plankton cultures will generally not develop in the finfish culture stages 16 because the turnover rates are generally faster than the generation time of most planktonic species. This is a further advantage in insuring maintenance of a sufficiently high quality environment for effective and rapid finfish growth and development.

While pump means will generally be necessary to feed the influent ocean waters 12 into the intake zone 14, the various culture stages of the system 10 may conveniently be arranged for gravity flow of the ocean waters 12 through the various stages and out of the seaweed culture stage 44 back into the ocean. It will be appreciated, however, that pump means may be provided between the stages if desired or if required by the topography.

In the shrimp culture stages 26.1 and 26.2, a desired species of shrimp will be cultured. This may conveniently, for example, be Penaeid shrimp. The shrimp will be placed in the vessels 28 at an appropriate stage of development and will be harvested from those stages at a desired time.

Each vessel 28 will be of an appropriate configuration and design for the species of shrimp being reared therein as is known to those of ordinary skill in this art. Similarly, each of the other culture stages will be of an appropriate configuration and design for the marine species to be cultured therein, as is known to persons of ordinary skill in the art.

Plankton nutrients 52 are supplied to the shrimp culture stages 26 for the culture of plankton in those stages to constitute shrimp feed for the culture of shrimp in the stages 26.

The plankton nutrients 52 will be supplemented by the finfish excreta and finfish feed waste carried into the shrimp culture stages 26 by the finfish culture stage effluent 20.

The plankton nutrients 52 will be fed to the shrimp culture stages 26 at an appropriate rate and will be of an appropriate type for the effective development of phytoplankton in the vessels 28, and thus the development of zooplankton to constitute shrimp feed for the shrimp in the vessels 28.

The plankton nutrients 52 may be selected from those which are known to be suitable and effective for plankton growth stimulation and development by those of ordinary skill in this art.

Thus, for example, plankton nutrients in the form of phosphorus- and nitrogen-containing compounds may be added. If diatoms are the preferred phytoplankton species to be grown in the vessels 20, silicates should be included in the plankton nutrients 52 to balance the amounts of nitrogen- and phosphorus-containing compounds supplied.

The relative quantities of nitrogen- and phosphorus-containing compounds and silicates will be governed by the growth requirements of the plankton species. These nutrients will be provided in chemical combinations of the compounds which are most inexpensively and readily available and are soluble in seawater under the prevailing environmental conditions. Thus, for example, nitrogen may be provided in the form of ammonium salts, urea, animal manure and the like. Phosphorus may be added in the form of potassium phosphates, sodium phosphate, super phosphates and the like. Silicates may be added in the form of sodium silicate or other soluble silicates.

In one typical example of the invention, for example, nitrogen may be added at the rate of 640 grams per 1000 cubic meters of sea water while phosphorous may be added at the rate of 128 grams per 1000 cubic meters of sea water. If the phytoplankton species is diatoms, silica may be added at the rate of 1120 grams per 1000 cubic meters of seawater.

The flow of fluid through the vessels 28 will be controlled to insure that adequate oxygen levels are maintained but so that the flow rate is sufficiently slow for phytoplankton and zooplankton blooms to establish themselves and provide a qualitatively important fraction of the nutrient requirements of the shrimp in the vessels 28. Thus, for example, the flow rate may be controlled through the vessels 28 to provide a turnover rate of ocean water varying from say 5 to 20 percent per day.

By insuring that a qualitatively important fraction of the shrimp feed nutrient requirements is provided by the natural phytoplankton and zooplankton blooms which develop in the shrimp culture stages 26.1 and 26.2 as a result of the addition of plankton nutrients or fertilizer 52 and the addition of finfish excreta and finfish feed waste from the finfish culture stages 16, the cost of shrimp feed will be reduced.

The shrimp culture stages 26 will also be supplied with a shrimp feed supplement 54 at regular intervals to supplement the plankton shrimp feed thereby providing for rapid and effective shrimp development and growth.

A major part of the shrimp feed supplement 54 is preferably generated in the system 10, as is described below, to improve the economics of the system. However, the shrimp feed supplement 54 may, if desired, at least partially comprise a formulated shrimp feed prepared on the basis of knowledge possessed and information available to those of ordinary skill in the art to provide a complete and effective diet for the shrimp.

The shrimp culture stage effluent 30 flows into the vessels 38.1 and 38.2 of the first and second filter feeder stages.

In the first filter feeder stage 36.1, filter feeders such as clams, oysters, scallops etc. may be cultured. In the second filter feeder stage 36.2, filter feeders in the form of brine shrimp are cultured.

The filter feeders in the stages 36.1 and 36.2 utilize as their nutrients the phytoplankton and zooplankton blooms produced in the shrimp culture stages 26, the waste products of the shrimp and the shrimp feed, and those waste products from the finfish culture stages 16 which pass through the shrimp culture stages 26.

The brine shrimp are cultured in the vessels 38.2 and are harvested therefrom to serve as the feed supplement 54 for the shrimp in the vessels 28 and to serve as part of the finfish feed 50 for the finfish culture stages 16.

The phytoplankton and zooplankton produced in the shrimp culture stages 26 provide a significant amount of the food for the shrimp in the vessels 28. For this reason, the feed supplement 54 can be of a lower quality and need not contain all the necessary nutrients for a complete shrimp diet. Thus, for example, vitamin C, a significant amount of protein and several of the essential fatty acids will be provided to the shrimp by the planktonic species developed in the vessels 28. The brine shrimp produced in the vessls 38.2 will therefore constitute an adequate and effective feed supplement 54 for the shrimp in the vessels 28.

The clams, oysters, scallops and other shell fish produced in the vessels 38.1 will be produced for the market. However, slow growing and crowded specimens may be culled from the system and introduced into the finfish culture stages 16 as part of the finfish feed 50, and into the shrimp culture stages 26 as part of the shrimp feed supplement 54.

The turnover rate of fluid in the filter feeder stages 36 will be regulated to achieve maximum utilization of the food and maximum growth of the species of filter feeders utilized. This will vary for clams, oysters, scallops and brine shrimp as a function of the size of the creatures, their density, etc. Again, as stated previously, the vessels 38.1 and 38.2 will be organized in a manner known to those of ordinary skill in the art for the culture of the particular filter feeder species selected for culture.

It will be appreciated that the flow rates through the various stages of the system will determine the waste removal rates and will govern the development of planktonic species and the oxygen levels in the various stages. The particular flow can be adjusted depending upon the physical arrangement of flow, that is whether the fluid is well mixed in each of the vessel, whether the outflow is from the bottom, from the top or from an intermediate level and, in systems with rapid turnover, by the specific in-flow designs.

The effluent from the filter feeder stages 36 flows into the seaweed culture stage 44 for the culture of desired species of seaweed and for the purging or clarification of the effluent.

The seaweed culture stage 44 therefore provides the dual advantage that commercially valuable seaweed crops may be cultured and that waste products may be removed and utilized to clarify or purge the effluent prior to discharge of the final effluent 46 into the sea.

The seaweed therefore cleans up the effluent and utilizes further the fertilizer and feeds which were introduced into the system 10.

While various types of seaweed may be selected, preferred types of seaweed which could be cultured are, for example agar producing seaweeds such as red algae (Gelidum sp.) brown algae producing algae, red algae producing carrageenan (*Chondrus Crispus, Gigartina, Hypnea musciformis*) and other species such as Porphyra sp. which are used directly as human food. Environmental conditions, especially temperature will tend to determine which species can and should usefully be grown.

The marine polyculture system 10 of this invention will include the harvesting of the marine species cultivated therein at appropriate intervals.

The finfish, shrimp and filter feeder species raised in the system 10 will be harvested and processed for commercial utilization. The system of this invention therefore includes such processing and includes the utilization of processing waste resulting from the processing of these species, as portion of the finfish feed 50 and/or portion of the shrimp feed supplement 54.

The embodiment of the invention as described with reference to the drawing provides a number of advantages.

It provides the particular advantage that a marine culture system is provided which can utilize the unlimited quantities of available nutrient deficient or nutrient poor ocean waters for the effective development and growth of selected marine species including, in particular, finfish. The high purity and high oxygen levels of these ocean waters are therefore utilized to best advantage for finfish culture while permitting subsequent culture of other marine species.

By supplementing the finfish feed with brine shrimp or other filter feeders produced in the filter feeder stage 36.2, with culled filter feeders produced in the filter feeder stage 38.1, and with processing waste produced from processing the marine species produced in the system, the cost of the finfish feed can be reduced to commercially tolerable levels.

In addition, by adding plankton nutrients and controlling the system 10 to insure adequate and effective phytoplankton and zooplankton development in the shrimp culture stages 26, this provides a valuable constituent of the shrimp feed. Supplementation of the shrimp feed with filter feeders produced in the system 10, with processing waste and with fishfeed waste resulting from the fish feed culture stages 16, provides the advantage that the shrimp feed can again be provided at a viable cost.

In each stage of the system 10 the flow and quality of the fluid flowing through the system is altered, both by the organisms which are grown and by the supplements which are made, to make the system uniquely suitable, in each step of its sequence, for the particular type of marine organism or species being produced.

In short, the embodiment of the invention as described with reference to the drawing can provide the advantage that a significant amount of the highest cost ingredients of the fish and shrimp feed are produced in the system and that filter feeders of high commercial value can be produced in addition to shrimp and finfish.

If waters other than nutrient deficient ocean waters are employed in the polyculture system illustrated in the drawing, operation of the system will be adjusted to ensure that the quality of water for finfish culture is maintained in the culture stage 16, and to ensure that the feed requirements of the marine organisms and marine species in the system are appropriately met.

I claim:
1. A method of utilizing nutrient deficient ocean waters for the culture of marine species, which comprises:
  (a) maintaining a flow of nutrient deficient ocean waters into and through a finfish culture stage at a sufficient rate to limit the development of planktonic species in that stage, and supplying finfish feed to the stage for the culture of finfish therein;
  (b) maintaining a flow of finfish culture stage effluent through a shrimp culture stage, and supplying plankton nutrients to that stage for the culture of plankton to constitute shrimp feed for the culture of shrimp in that stage; and
  (c) maintaining a flow of shrimp culture stage effluent through a filter feeder stage for the culture of filter feeders therein.

2. A method according to claim 1, which further comprises feeding filter feeder stage effluent to a seaweed culture stage for the culture of seaweed and clarification of the effluent, and discharging effluent therefrom.

3. A method according to claim 2, which comprises supplying supplemental shrimp feed to the shrimp culture stage.

4. A method according to claim 3, which comprises producing brine shrimp as one filter feeder species in the filter feeder stage, and supplying brine shrimp so produced to the shrimp stage as suplemental shrimp feed.

5. A method according to claim 4, which comprises utilizing brine shrimp so produced as part of the finfish feed supplied to the finfish stage.

6. A method according to claim 2, which comprises culling filter feeders from the filter feeder stage, and supplying such culled filter feeders to the finfish stage as finfish feed.

7. A method according to claim 2 or claim 6, which comprises culling filter feeders from the filter feeder stage and supplying such culled filter feeders to the shrimp stage as a shrimp feed supplement.

8. A method according to claim 2, which comprises processing marine species produced, and feeding process waste of such marine species to the finfish and shrimp stages as feed.

9. A method according to claim 1 or claim 2, which comprises maintaining a flow rate through the finfish stage to maintain oxygen levels approaching saturation in that stage.

10. A method according to claim 1 or claim 2, in which each of the finfish, shrimp and filter feeder stages is arranged in the form of a plurality of ponds or raceways, with the ponds or raceways of each stage being arranged in parallel.

11. A marine polyculture system for the rearing of marine species, the system comprising:
 (a) maintaining a flow of salt water through a finfish culture stage to provide a water turnover rate in that stage greater than the generation time of common planktonic species, and supplying finfish feed to the stage for the culture of finfish;
 (b) maintaining a flow of finfish culture stage effluent through a crustacean culture stage and supplying plankton nutrients to the stage to develop plankton blooms in that stage for the culture of crustacean species in that stage; and
 (c) maintaining a flow of effluent from the crustacean culture stage through a filter feeder culture stage for the culture of filter feeders therein.

12. A system according to claim 11, further comprising discharging effluent from the filter feeder stage to a seaweed culture stage for the culture of seaweed and for the clarification of the effluent.

13. A system according to claim 12, in which the salt water is ocean water.

14. A system according to claim 13, in which the ocean water is nutrient rich deep ocean water.

15. A system according to claim 13 or claim 14, which comprises controlling the flow of water through the crustacean culture stage to allow the establishment of phytoplankton and zooplankton blooms in that stage to constitute a major food component for crustaceans in the form of shrimp in that stage.

16. A system according to claim 15, which comprises supplementing shrimp feed in the crustacean culture stage with filter feeders produced in the filter feeder culture stage.

17. A method of utilizing nutrient poor ocean waters for the culture of marine species, which comprises:
 (a) maintaining a flow of nutrient poor ocean water through a finfish culture stage at a rate to inhibit the development of common planktonic species in that stage;
 (b) supplying finfish feed to the finfish culture stage for the culture of finfish therein;
 (c) maintaining a flow of finfish culture stage effluent through a shrimp culture stage;
 (d) supplying plankton nutrients to the shrimp culture stage for the culture of plankton in that stage to constitute shrimp feed for the culture of shrimp in that stage;
 (e) maintaining a flow of shrimp culture stage effluent through a filter feeder culture stage for the culture of filter feeders in that stage; and
 (f) feeding filter feeder stage effluent to a seaweed culture stage for the culture of seaweed and for the removal of waste products from the effluent, and discharging effluent from that stage.

18. A method according to claim 17, which comprises producing brine shrimp in the filter feeder stage, and supplying produced brine shrimp to the finfish culture stage as finfish feed and to the shrimp culture stage as a shrimp feed supplement.

19. A method according to claim 17 or claim 18, which comprises recovering and processing finfish, shrimp and filter feeders produced in the stages, and supplying processing waste to the finfish and shrimp stages as feed.

* * * * *